(12) United States Patent
Grazebrook et al.

(10) Patent No.: US 10,578,176 B2
(45) Date of Patent: Mar. 3, 2020

(54) AIRCRAFT BRAKE AND COOLING METHODS THEREFOR

(71) Applicant: Airbus Operations Limited, Bristol (GB)

(72) Inventors: Alvery Noel Grazebrook, Bristol (GB); Neil Frost, Bristol (GB)

(73) Assignee: Airbus Operations Limited, Bristol (GB)

( * ) Notice: Subject to any disclaimer, the term of this patent is extended or adjusted under 35 U.S.C. 154(b) by 5 days.

(21) Appl. No.: 15/424,998

(22) Filed: Feb. 6, 2017

(65) Prior Publication Data

US 2017/0227079 A1 Aug. 10, 2017

(30) Foreign Application Priority Data

Feb. 9, 2016 (GB) .................................. 1602303.8

(51) Int. Cl.
| | |
|---|---|
| *F16D 65/78* | (2006.01) |
| *F16D 65/853* | (2006.01) |
| *F16D 65/84* | (2006.01) |
| *B64C 25/42* | (2006.01) |
| *F16D 121/02* | (2012.01) |

(52) U.S. Cl.
CPC ............ *F16D 65/853* (2013.01); *B64C 25/42* (2013.01); *F16D 65/84* (2013.01); *F16D 2065/781* (2013.01); *F16D 2065/783* (2013.01); *F16D 2121/02* (2013.01); *F16D 2200/0052* (2013.01)

(58) Field of Classification Search
CPC ........ F16D 65/78; F16D 65/84; F16D 65/853; F16D 2065/781; F16D 2065/783; F16D 2065/784
See application file for complete search history.

(56) References Cited

U.S. PATENT DOCUMENTS

| | | | | |
|---|---|---|---|---|
| 3,208,559 A | * | 9/1965 | Chambers | ............... F16D 55/40 188/264 AA |
| 3,876,027 A | * | 4/1975 | Crise | ...................... B60K 17/22 165/104.25 |
| 4,130,187 A | * | 12/1978 | Midolo | ................. F16D 65/853 188/264 CC |
| 5,613,578 A | * | 3/1997 | Moseley | ............... F16D 65/125 188/218 XL |
| 6,238,017 B1 | | 5/2001 | Eitel | |
| 2004/0245053 A1 | * | 12/2004 | Chico | ..................... B60T 13/74 188/71.5 |

(Continued)

FOREIGN PATENT DOCUMENTS

| | | | | |
|---|---|---|---|---|
| FR | 2287622 A1 * | 5/1976 | ............. | F16D 55/36 |
| GB | 653565 | 5/1951 | | |

(Continued)

OTHER PUBLICATIONS

Machine translation of FR 2287622 (no date).*

(Continued)

*Primary Examiner* — Nicholas J Lane
(74) *Attorney, Agent, or Firm* — Nixon & Vanderhye P.C.

(57) ABSTRACT

A method of cooling an aircraft brake including a brake pack and a reservoir in the form of a removable cartridge containing a coolant. The method includes vaporizing the coolant using heat energy from the brake pack.

28 Claims, 2 Drawing Sheets

(56) References Cited

U.S. PATENT DOCUMENTS

| | | | | |
|---|---|---|---|---|
| 2010/0286881 A1* | 11/2010 | Cahill | ............... | B60T 8/00 |
| | | | | 701/70 |
| 2012/0153753 A1* | 6/2012 | Hanlon | ............... | F16D 65/14 |
| | | | | 310/77 |
| 2013/0092787 A1* | 4/2013 | Polubinski | ............... | B64C 25/42 |
| | | | | 244/50 |
| 2015/0136547 A1* | 5/2015 | Chambard | ............... | B23P 6/00 |
| | | | | 188/218 XL |
| 2015/0168077 A1* | 6/2015 | Hodowanec | ............... | F28D 15/0275 |
| | | | | 192/215 |
| 2015/0275993 A1* | 10/2015 | Elsesser | ............... | F16D 13/72 |
| | | | | 188/264 D |

FOREIGN PATENT DOCUMENTS

| | | |
|---|---|---|
| GB | 739244 | 10/1955 |
| GB | 1223547 | 2/1971 |
| JP | 0495619 | 3/1992 |

OTHER PUBLICATIONS

Combined Search and Examination Report cited in GB 1602303.8, dated Jul. 22, 2016, eight pages.
Airflex® brochure, EATON Airflex® Clutches & Brakes 10M1297GP, Nov. 2012, pp. 158-179.

* cited by examiner

AIRCRAFT BRAKE AND COOLING METHODS THEREFOR

CROSS RELATED APPLICATION

This application claims priority to United Kingdom Patent Application No. 1602303.8, filed Feb. 9, 2016, and incorporates the entire contents of this application.

BACKGROUND OF THE INVENTION

The present invention concerns brakes for use on aircraft landing gear. More particularly, but not exclusively, this invention concerns methods of cooling an aircraft brake, particularly the brake pack. The invention also concerns an aircraft brake for use in such methods, a cartridge for use in such a brake and an aircraft landing gear and an aircraft including such brakes.

Modern aircraft, particularly large aircraft, often use hydraulically actuated disc-type brakes on the landing gear. A typical aircraft brake may comprise a brake pack (also known as a heat pack) comprising a plurality of rotors (connected to the moving wheel) and a plurality of stators (connected to the landing gear bogies via a common piston), and a hydraulic system arranged to move the stators into contact with the rotors when a braking command is received. During braking a significant proportion of the kinetic energy of the aircraft is converted into heat energy that leads to a temperature rise in the brake pack.

In contrast to other vehicle types, aircraft brakes must deal with large energy loads during relatively short and infrequent braking events. This is in contrast to, for example, automotive or railway brakes where braking may be happening almost continuously throughout a journey.

Typically, the size of an aircraft brake pack is primarily dictated by the need to maintain the brake pack within a given temperature range during operation. Currently, the size of a brake pack is often dictated by the need to absorb the large amount of energy generated during a Rejected Take Off (RTO). During normal operations (for example standard take off, landing and taxiing operations) the amount of energy that must be dissipated by the brake pack is lower. It would be advantageous to be able to reduce the size (and therefore mass) of the brake pack in order to increase aircraft efficiency, in particular fuel efficiency.

The temperature of an aircraft's brakes may also play a role in determining the minimum turnaround time of an aircraft during normal operation. A certain amount of time may be required between flights in order to allow the brakes to cool after landing and taxiing to the stand. On routes where an aircraft will take off and land several times during a day brake temperature may accumulate over time. It may be necessary to take account of this heat build-up when route planning in order to ensure that sufficient time between flights is allowed to ensure brakes remain within their operating limits. Accordingly, it would be advantageous to be able to reduce, and/or improve control of, brake temperature.

One prior art method of cooling aircraft brakes is to use a recirculating fluid coolant to remove heat from the brake pack. An example of a brake using such a prior art method is the Eaton Airflex Water-Cooled Brake. However, the amount of heat such a system can remove from the brake pack during a relatively short braking event is limited and accordingly such system may have a limited impact on the maximum temperature reached during a braking event. The use of such systems also increases the complexity of the brake assembly. Another prior art method of cooling aircraft brakes employs fans to generate a convective air flow over the brake pack, see for example US 2009/152055 and U.S. Pat. No. 6,615,958. Again, while this method can be useful in increasing the rate of cooling of a brake pack following a braking event, it has less impact on the maximum temperature reached during such a braking event. It would be advantageous to be able to increase the impact of a cooling system on brake temperature during a braking event, and/or to do so in a mechanically simple way.

The present invention seeks to mitigate the above-mentioned problems. Alternatively or additionally, the present invention seeks to provide an improved apparatus and method for heat management in aircraft brake pads.

SUMMARY OF THE INVENTION

The present invention provides, according to a first aspect, a method of cooling an aircraft brake, and in particular an aircraft brake pack. The brake comprises a brake pack and a reservoir containing a coolant. The method comprises the step of vaporising the coolant using heat energy from the brake pack.

The latent heat of vaporisation ($h_{fg}$, also known as the enthalpy of vaporisation) represents the amount of energy needed to vaporise a unit mass of saturated liquid at a given temperature or pressure. Methods in accordance with the present invention may limit the temperature rise (i.e. cool) a brake pack by using some of the heat energy generated during the braking process to bring about a change in state of the coolant, rather than a rise in temperature of the brake. In cases where the size of the brake pack is dictated by the need to limit the temperature rise that occurs during a braking event, taking advantage of the latent heat of vaporisation may provide a way of reducing the size (and therefore the mass) of the brake pack.

The method may comprise the step of melting the coolant using heat energy from the brake pack. Thus, the method may also take advantage of the latent heat of fusion ($h_{fus}$, also known as the enthalpy of fusion) as a means of absorbing heat energy during aircraft braking. The method may comprise the step of melting the coolant and then vaporising the coolant using heat energy from the brake pack. It will be appreciated that is some situations it may be advantageous to melt but not vaporise a coolant. The method may comprise a step of freezing a liquid coolant prior to braking, for example during flight, and then melting the coolant using heat energy from the brake pack.

It will be appreciated that where the present application refers to the temperature of the brake, such statements may equally apply to the temperature of the brake pack (and/or other components of the brake) as well as to the temperature of the brake assembly as a whole (and vice versa).

The step of vaporising the coolant may comprise providing a conductive path configured to conduct heat between the reservoir and the brake pack such that conductive heat transfer can occur. The step of vaporising the coolant may comprise contacting the brake pack with the reservoir such that conductive heat transfer between the brake pack and the reservoir can take place. The reservoir may contact the inner rim of one or more stators or rotors of the brake pack.

The method may further comprise the step of releasing vaporised coolant from the reservoir. Releasing vaporised coolant from the reservoir may increase the efficiency of the cooling process.

The method may comprise releasing vaporised coolant from the reservoir in dependence on the temperature of the brake. For example, the vaporised coolant may be released from the reservoir when a portion of the brake, for example the brake pack or reservoir, reaches a threshold temperature. The step of releasing the vaporised coolant from the reservoir may comprise melting a fusible portion of the reservoir, for example a fusible portion of the cartridge. The step of releasing the vaporised coolant from the reservoir may comprise opening a valve.

The temperature of the brake pack before a braking event may be referred to as the ambient temperature. The brake pack may be designed to function within a particular temperature range, referred to as the design temperature range, the lower limit of which is higher than the ambient temperature. The method may comprise the step of releasing the vaporised coolant once a threshold temperature, for example a temperature above the lower limit of the design temperature range, is reached. Delaying cooling of the brake pack until the design temperature range is reached may facilitate more efficient functioning of the brake pack.

The method may comprise directing the vaporised coolant released from the reservoir over a portion of the brake such that the brake is convectively cooled using vaporised coolant released from the reservoir. Thus, the method may comprise a first stage in which the brake is cooled by conductive heat transfer from the brake pack to the reservoir and the coolant contained therein. The method may comprise a second stage in which the brake is cooled by convective heat transfer from the brake via vaporised coolant that has been released from the reservoir. It may be that at least part of the first and second stages occur at the same time. The vaporised coolant released from the reservoir may pass through a portion of the brake. The vaporised coolant may pass over a portion of the brake pack such that convective heat transfer can take place.

Alternatively, the vaporised coolant may remain in the reservoir. In the case that the vaporised coolant remains in the reservoir throughout the method, the method may comprise a step of condensing the vaporised coolant for reuse during a subsequent braking event.

The reservoir may comprise a replaceable cartridge containing the liquid coolant.

The method may comprise replenishing the reservoir after a braking event by replacing the cartridge. Having a reservoir in the form of a replaceable cartridge may facilitate efficient replenishment of the reservoir during the short turnaround times often required by aircraft operators.

The method may comprise replenishing the reservoir after a braking event using a quantity of coolant obtained from an aircraft system. Using an aircraft system to provide a supply of coolant may increase efficiency by reusing aircraft waste products and/or simplifying maintenance. The aircraft system may comprise the waste water system and the coolant may be treated waste water. The aircraft system may comprise a hydrogen fuel cell and the coolant may be a bi-product of such a cell, for example pure water. The aircraft system may comprise an aircraft fuel tank, and the coolant may comprise water drained from the fuel tank. For example, the aircraft system may comprise a fuel tank having a graphene filtered water drain as discussed in the Applicant's pending PCT Application No. PCT/GB2015/051099, the details of which are incorporated herein by reference.

In the case that vaporised coolant is released from the reservoir, the method may comprise the step of condensing the vaporised coolant after it has been released from the reservoir. The method may comprise replenishing the reservoir using the recondensed coolant.

The method may comprise moving the reservoir from a first position spaced apart from the brake pack to a second position wherein a portion of the reservoir is in contact with the brake pack such that conductive heat transfer between the brake pack and the reservoir can occur. Methods in which the reservoir can be moved into and out of contact with the brake pack may provide an increased degree of control over the cooling process compared to methods in which the position of the reservoir is fixed. The brake pack may comprise at least one stator or rotor and the method may include moving the reservoir from the first position spaced apart from said rotor or stator to the second position wherein a portion of the reservoir is in contact with said rotor or stator such that conductive heat transfer between the rotor or stator and the reservoir can occur. The method may comprise moving the reservoir into contact with the inner rim of a stator or rotor. Thus, the method may comprise moving the cartridge from a first position spaced apart from the brake pack to a second position wherein a portion of the cartridge is in contact with the break pack such that conductive heat transfer between the brake pack and the reservoir can occur.

The method may comprise moving the reservoir from the first position to the second position when the brake pack reaches a threshold temperature. For example, the method may include moving the reservoir into the second position when the brake reaches a threshold temperature, for example the lower limit of a design temperature range.

Alternatively, the method may comprise the step of moving the reservoir (or cartridge) into the second position at the start of the braking event. Starting the cooling process at the beginning of the braking event may limit the thermal shock experienced by the brake pack thereby extending the life of the pack.

The method of the present invention may be carried out in response to a braking event. A braking event may be defined as beginning when the brakes are applied (e.g. when the rotors and stators are brought into contact) in order to reduce the speed of the aircraft and ending when the aircraft reaches the target speed and the brakes are released (e.g. when the rotors and stators are moved out of contact). It will be appreciated that an anti-skid system may continuously release and reapply the brakes during a single braking event. The method of the present invention may be carried out during a braking event. Vaporisation of the coolant may occur during the braking event. The majority of the coolant, for example substantially all of the coolant, in the reservoir may be vaporised during the braking event. Vaporisation of the coolant may continue for a period of time immediately following the braking event. Some or all of the vaporised coolant may be released from the reservoir during the braking event. Vaporisation of the coolant may occur while the brakes are being applied. It may be that the method is carried out in response to a Rejected Take Off but preferably not otherwise. For example, it maybe that the method is not carried out during a standard landing. It may be that the method is carried out in response to a standard landing. It may be that the method is carried out during each landing. The method may be carried out while taxiing.

In the case that the method is carried out during a normal operational event (for example a landing), the method may be repeated on a regular basis (for example more than once, for example up to four, six or eight times, in a twenty-four hour period). Thus, there may be provided a method of cooling an aircraft brake in which the process of (a) vaporising the coolant using heat energy from the brake pack during landing, and then (b) replenishing the supply of coolant (e.g. by replacing a cartridge or refilling a reservoir) is repeated on a regular basis. Such methods may allow a reduction of the size (and therefore mass of the brake pack) but require additional servicing actions (e.g. replenishing the supply of coolant).

In the case that the method is only carried out during an extreme event, for example an RTO event, the method may occur on a non-regular basis, for example less than once a year. Thus, there may be provided a method of cooling an aircraft brake in which the process of (a) vaporising the coolant using heat energy from the brake pack during landing, and then (b) replenishing the supply of coolant (e.g. by replacing a cartridge or refilling a reservoir) is repeated on a non-regular basis. Such methods may allow a smaller reduction in the size (and therefore mass) of the brake pack, but reduce the need for the additional servicing actions associated with regularly replacing the coolant.

According to a second aspect of the invention there is provided an aircraft brake comprising a brake pack and a reservoir containing a liquid coolant. The brake being arranged such that, in use, the brake pack is cooled by vaporising the liquid coolant using heat energy from the brake pack.

The reservoir may be arranged to provide a local store of coolant contained within the brake, for example within the brake pack. The reservoir may be contained, for example completely contained, within the brake, for example within the brake pack. The reservoir may be in the form of a capsule or tank. It will be appreciated that in contrast to prior art methods in which cooling is achieved by a circulating coolant, the brake may be arranged such that there is substantially no flow rate into the reservoir while the brake is being cooled.

The coolant may be a liquid at room temperature and atmospheric pressure at sea level. The coolant may be a solid at aircraft cruise conditions (i.e. temperature and pressure conditions experienced when the aircraft is in cruise). The coolant may be distilled water.

It may be that when the brake is in a first configuration the reservoir, for example a portion of the cartridge, is in contact with the brake pack such that conductive heat transfer between the reservoir and the brake pack can occur. The reservoir may be in contact with one or more of the stators of the brake pack. The reservoir may be in contact with one or more rotors of the brake pack.

The reservoir may be mounted for movement between a first position spaced apart from the brake pack to a second position wherein a portion of the reservoir is in contact with the brake pack such that conductive heat transfer can occur. Thus, in the case that the reservoir comprises a cartridge, the cartridge may be mounted for movement between the first and second positions. It may be that, when the brake is in the first configuration there is provided a conductive path configured to conduct heat between the reservoir and the brake pack such that conductive heat transfer can occur. The reservoir and the brake pack may be located directly adjacent to each other in the first configuration. The reservoir and the brake pack may be in direct contact in the first configuration.

It may be that the reservoir is arranged to release the vaporised coolant to atmosphere during a braking event. The reservoir may be arranged to prevent the escape of liquid coolant while the vaporised coolant is being released. The brake may be configured such that vaporised coolant released from the reservoir passes over a portion of the brake to be cooled for example the brake pack. Alternatively, it may be that the brake is configured such that vaporised coolant released from the reservoir is directed away from the brake pack. Directing vaporised coolant released from the reservoir away from the brake pack may reduce the risk of corrosion of the brake pack and/or extend the lifespan of the brake pack. The brake may comprise a guide portion arranged to direct the vaporised coolant.

The reservoir may comprise a fusible portion arranged such that melting of the fusible portion allows the coolant to escape from the reservoir. Where the reservoir comprises a cartridge, the fusible portion may form part of the cartridge. The fusible portion may be arranged to melt once the temperature of the brake reaches a threshold temperature. The fusible portion may comprise a material having a melting point around the threshold temperature.

The reservoir may comprise a removable cartridge. The cartridge may contain the coolant. The replaceable cartridge may comprise a body having a cavity therein in which the coolant can be received. The replaceable cartridge may comprise one or more openings which, in use, allow the coolant to move between the cavity and the exterior of the cartridge. The cartridge may comprise a fusible bung located in the or each opening of the cartridge such that fluid cannot escape the cartridge until the brake reaches the threshold temperature at which the bung melts. The brake may be configured to receive a cartridge. The brake may comprise a mounting portion arranged to receive a cartridge. The cartridge may comprise a mounting portion arranged to operably connect with the mounting portion of the brake.

The brake may be arranged such that, in use, the reservoir is able to receive a supply of coolant from an aircraft system. Thus, when in use on an aircraft, the reservoir may be in fluid communication with an aircraft system. The reservoir may comprise an outlet which, in use, is in fluid communication with an aircraft system.

According to a further aspect of the invention there is provided an aircraft brake configured for use in any other aspect. The brake may be a carbon brake. The brake may be a steel brake. It will be appreciated that the invention may be applied to brakes comprising other materials.

According to further aspects of the invention there is provided an aircraft brake configured for use in the method of any other aspect, including when such a brake is separate from one or more of the aircraft, reservoir and/or coolant. There is also provided a cartridge configured for use as the cartridge of any other aspect, separately or together with the coolant, and an aircraft landing gear comprising a brake of any other aspect as well as an aircraft including such a landing gear. The aircraft may comprise an aircraft system, for example a system that produces waste water, a hydrogen fuel cell or a fuel tank from which water can be drained.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
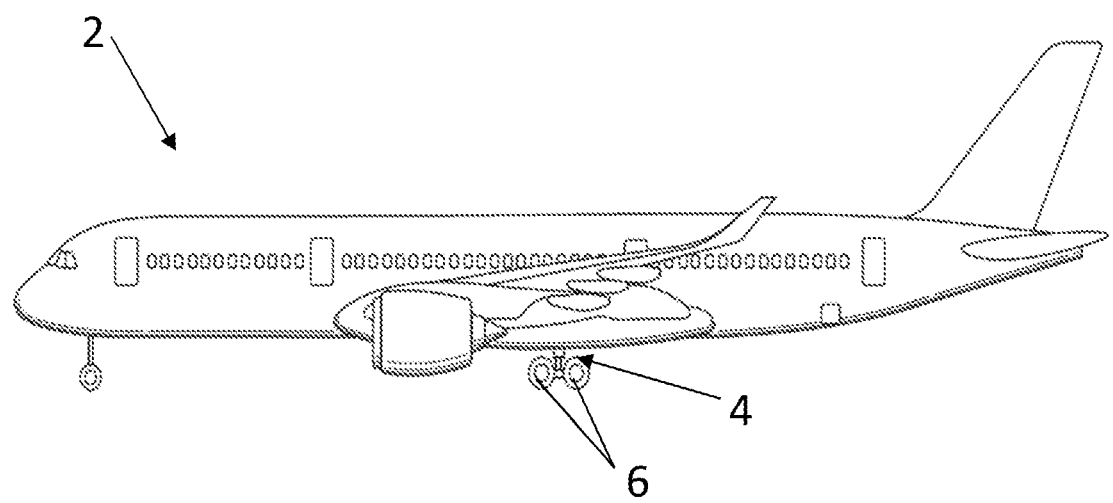
FIG. 1 shows an aircraft including a brake according to a first embodiment of the invention.

FIG. 1 shows an aircraft 2 having main landing gear 4, the main landing gear 4 including a landing gear bogie 5 and wheels 6. Each wheel 6 is associated with a brake 8 (not shown separately in FIG. 1). As shown schematically in FIG. 2, each brake 8 includes a brake pack 10 having several disk-like carbon stators 10a connected to the landing gear bogie 5 and several disk-like rotors 10b connected to the wheel 6, and a hydraulic system 12 arranged to move the stators 10a into contact with the rotors 10b in order to apply the brake 8. Also included in brake 8 is a cartridge 14 which is in contact with the inner rim of each stator 10a. Prior to use the cartridge 14 contains a quantity of distilled water 16. The cartridge 14 also includes a bung 18.

In use, when the brakes are applied heat is generated within the brake pack 10 due to friction between the rotors 10a and stators 10b. A portion of this heat energy is transferred to the cartridge 14 and from there to the water 16 by the process of conduction. The water 16 is initially in a liquid state, but once the temperature of the water has reached boiling point, further heat energy acts to change the state of the water from liquid to gas. The energy absorbed by this process cannot contribute to a rise in the temperature of the brake pack. Accordingly, in embodiments according to the present invention vaporisation of a coolant is used to limit the temperature rise (i.e. cool) a brake pack during a braking event thereby allowing the size (and therefore mass) of the brake pack to be reduced in comparison with prior art brakes.

If the brakes are applied during an RTO event the water will be in a liquid state. However, if the brakes are applied during landing the distilled water may be in a solid (frozen) state due to prolonged in-flight exposure to the low temperatures found at high altitude. In this case heat energy will be absorbed both in changing the state of the water from frozen to liquid and from liquid to vapour.

Figure 2:
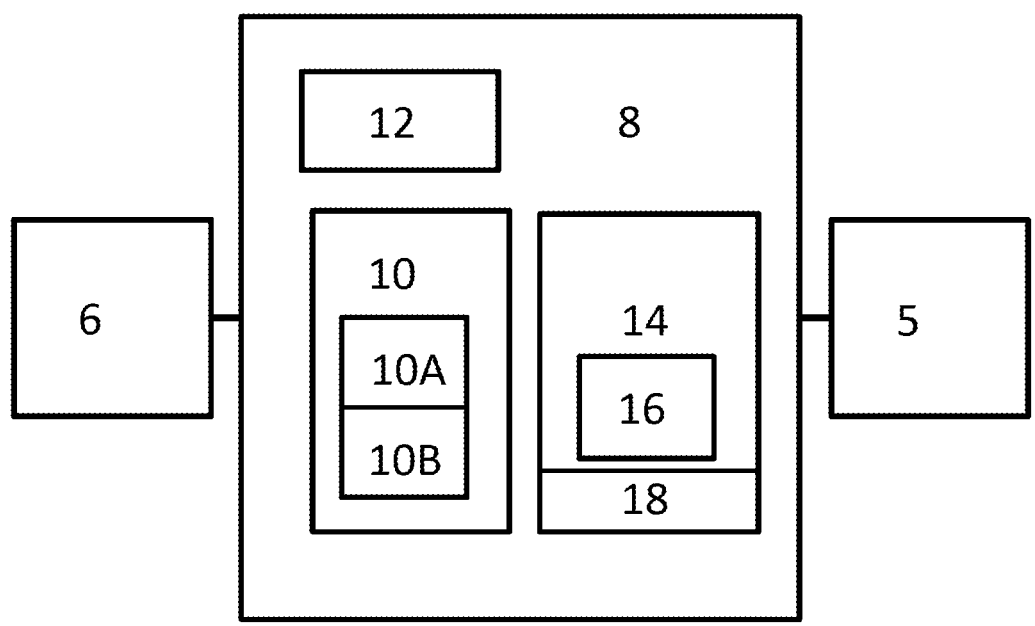
FIG. 2 shows a schematic view of the brake of the first embodiment.

In some embodiments in accordance with FIG. 2 the amount of heat generated during normal braking operations is sufficient to melt the bung 18. In other embodiments, temperatures sufficient to melt bung 18 are only reached during extreme cases such as RTO. In either case, once the bung 18 is melted vaporised coolant can escape from the cartridge 14, through the brake pack 10 and out of the brake 8 to atmosphere. This flow of vaporised coolant may itself act to further cool the brake pack convectively. Moreover, as the latent heat of vaporisation decreases as pressure increases allowing vapour to escape and thereby maintaining a substantially constant pressure in the cartridge 14 may increase the amount of energy absorbed by a given quantity of water 16. Accordingly, in embodiments according to the present example, the material properties (e.g. melting point) of the bung 18 may be used to control the cooling process. Using a fusible bung 18 to release the coolant at a given temperature also renders systems in accordance with the present embodiment passive which is advantageous in safety-critical systems. Once a cartridge 14 has been used (i.e. after the coolant 16 has been allowed to escape) it is replaced with a new cartridge 14 containing a full quantity of coolant. Where the melting point of the bung 18 is low enough that vaporised coolant is released during normal operations, the coolant cartridge 14 will need to be replaced after every flight. Where the melting point of the bung 18 is high enough that only the RTO case results in the release of vaporised coolant, the coolant cartridge 14 will only need to be replaced occasionally.

Figure 3:
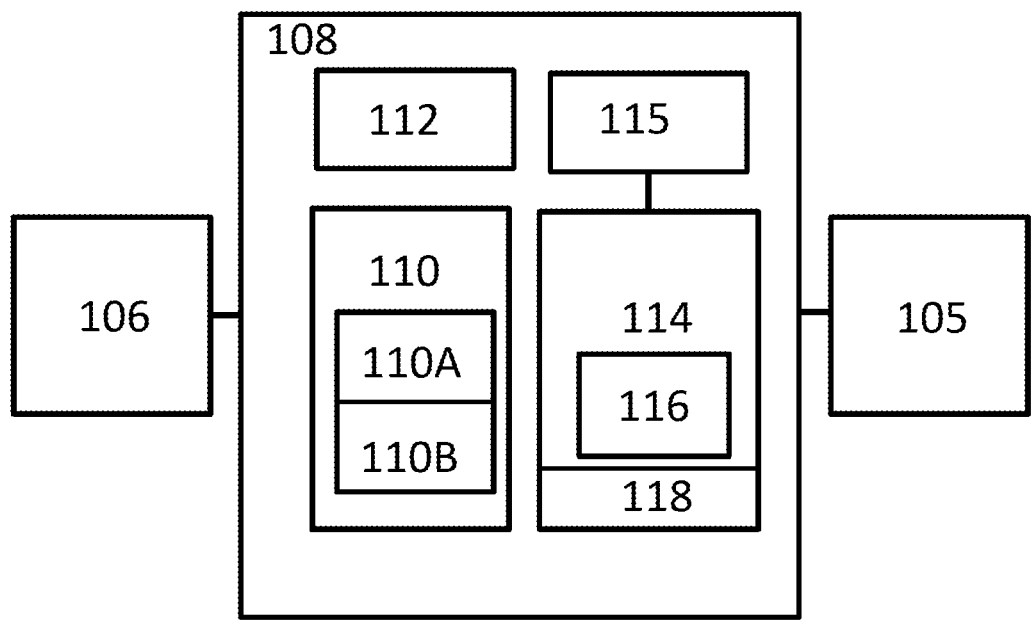
FIG. 3 shows a schematic view of a brake according to a second embodiment of the invention.

FIG. 3 shows a schematic view of an aircraft brake in accordance with a second example embodiment (like reference numerals have been used to indicate like parts). Only those aspects of the second embodiment which differ from the first embodiment will be discussed here. In the second embodiment the cartridge 114 is connected to an actuator 115. In use, prior to a braking event, the cartridge 114 is spaced apart from the inner rim of the stators 10a and the brake pack is at ambient temperature. When the brakes are applied the temperature within the brake 102 begins to rise. Once the brake pack reaches a predetermined temperature, for example the lower limit of the temperature range in which the brake is designed to operate, the actuator 115 moves the cartridge 114 into contact within the inner rim of the stators 10a. Accordingly, in embodiments according to the present example, the actuator may be used to control the point at which the coolant is exposed to the full heat of the brake pack and thereby maintain the brake in the optimal performance envelope.

Figure 4:
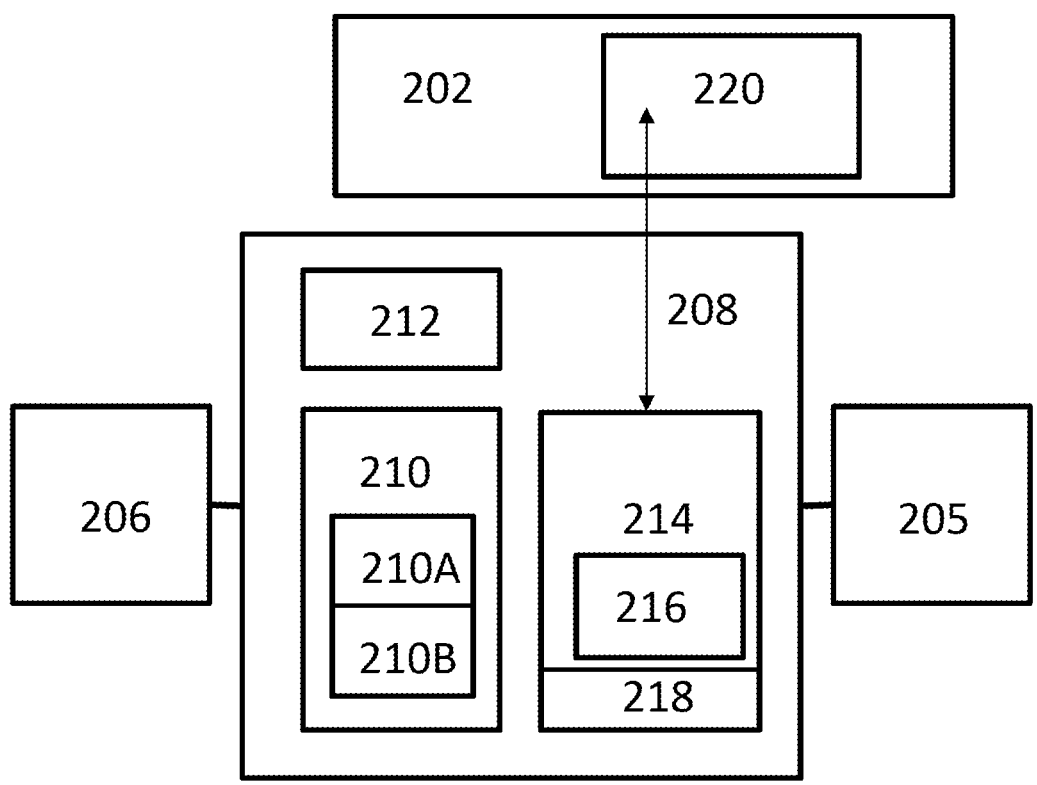
FIG. 4 shows a schematic view of a brake according to a third embodiment of the invention.

FIG. 4 shows a schematic view of an aircraft brake in accordance with a third example embodiment (like references numerals have been used to indicate like parts). Only those aspects of the third embodiment which differ from the first embodiment will be discussed here. In the third embodiment a refillable reservoir 214 has replaced cartridge 14. The refillable reservoir is in fluid communication with the waste water system 220 of the aircraft 202. The reservoir 214 includes a pressure-release valve 218. Prior to take-off fluid is drawn from the waste water system 220 of the aircraft 200 into the reservoir 214. During a braking event, heat is transferred to the reservoir 214 and acts to change the state of the water 216 as discussed for the first embodiment, above. When a given pressure is reached inside the reservoir 214, pressure-release valve 218 opens and allows the vaporised coolant to escape. During flight or when the aircraft is on the ground the reservoir 214 can be replenished from the waste water system 220 so that the cooling system can be used again on landing.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the above embodiments the cartridge or reservoir is in contact with the inner rim of the stators of the brake pack. It will be appreciated that the cartridge or reservoir may be in contact with other elements of the brake pack.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of cooling an aircraft brake, the brake comprising a brake pack and a cartridge containing a coolant, wherein the brake pack includes stators attached to a landing gear bogie and rotors attached to a wheel, and the cartridge is positioned in the brake, the method comprising:
   prior to a braking event, the cartridge is spaced apart from and is out of contact with all of the stators and the rotors in the brake pack;
   during the braking event, the cartridge moves into contact with multiple ones of the stators of the brake pack; and
   vaporizing the coolant in the cartridge by transferring heat energy from the brake pack to the coolant, during a braking event and while the cartridge is in contact with the at least one of the stators and the rotors.

2. The method of cooling an aircraft brake according to claim 1, the method further comprising the step of melting the coolant using heat energy from the brake pack before vaporising the coolant and after moving the replaceable cartridge into contact with at least one of the stators.

3. The method of cooling an aircraft brake according to claim 1, the method further comprising the step of releasing vaporized coolant from the cartridge.

4. The method of cooling an aircraft brake according to claim 3, wherein the method further comprises releasing vaporized coolant from the cartridge in dependence on a temperature of the brake.

5. The method of cooling an aircraft brake according to claim 3, wherein the method further comprises directing the vaporized coolant released from the cartridge over a portion of the brake such that the brake is convectively cooled using the vaporized coolant released from the reservoir.

6. The method of cooling an aircraft brake according to claim 1, wherein the method further comprises replenishing the reservoir after a braking event using a quantity of coolant obtained from an aircraft system.

7. The method of cooling an aircraft brake according to claim 3, wherein the method comprises condensing the vaporized coolant released from the reservoir and using a quantity of the condensed coolant to replenish the reservoir after a braking event.

8. The method of cooling an aircraft brake according to claim 1, wherein the moving of the reservoir is in response to the brake pack reaching a threshold temperature.

9. The method of cooling at aircraft brake according to claim 1, wherein the method is carried out in response to a Rejected Take Off.

10. The method of cooling at aircraft brake according to claim 1, wherein the method is carried out in response to a landing.

11. An aircraft brake for a landing gear of an aircraft, the aircraft brake comprising:
   a brake pack including stators and rotors, wherein the stators are configured to be connected to a landing gear bogie of the landing gear and the rotors are configured to be connected to a wheel of the landing gear; and
   a removable cartridge external to the brake pack containing a liquid coolant, wherein the removable cartridge is configured to move between a first position spaced apart from the brake pack and a second position at which the removable cartridge is in contact with and in thermal communication with multiple ones of the stators or rotors of the brake pack;
   wherein the brake is arranged such that, in use, the brake pack is cooled by vaporizing the liquid coolant in the removable cartridge using heat energy from the brake pack.

12. The aircraft brake according to claim 11, wherein the removable cartridge is arranged to release the vaporized coolant to atmosphere during a braking event.

13. The aircraft brake according to claim 12 wherein the removable cartridge comprises a fusible portion arranged such that melting of the fusible portion allows the coolant to escape from the cartridge.

14. The aircraft brake according to claim 11, wherein the brake is arranged such that, in use, the removable cartridge receives a supply of coolant from an aircraft system.

15. The aircraft brake according to claim 11 wherein the aircraft brake is separable from one or more of the aircraft, the removable cartridge and/or the liquid coolant.

16. The aircraft brake according to claim 11 wherein the removable cartridge is separable from one or more of the aircraft brake and/or the liquid coolant.

17. The aircraft landing gear comprising the brake in accordance with claim 11, wherein the landing gear includes at least one additional brake and wheel.

18. The aircraft comprising the landing gear in accordance with claim 17.

19. A method to cool an aircraft brake comprising:
   during a rejected takeoff of an aircraft, braking the aircraft by actuating a brake pack to apply stators in the brake pack against rotors in the brake pack, wherein the rotors rotate with a wheel of the aircraft and the stators are attached to a landing gear bogie;
   in response to the braking, moving a replaceable cartridge in the aircraft brake from a first position spaced apart from and out of contact with all of the stators and rotors, and to a second position in which the replaceable cartridge is in contact with multiple ones of the stators or the rotors of the brake pack;
   while the replaceable cartridge is in contact with the at least one of the stators or rotors, cooling the brake pack during the rejected takeoff by applying heat energy from the at least one stators or rotors to vaporize a coolant in the replaceable cartridge;
   removing the replaceable cartridge after the rejected takeoff, and
   after the removal, mounting the replaceable cartridge or mounting another replaceable cartridge to a position in the aircraft brake spaced apart from the brake pack.

20. The method of claim 19 further comprising:
   freezing the coolant in the reservoir while the aircraft is in flight, and
   melting the coolant during the landing.

21. The method of claim 19 further comprising venting the vaporized coolant from the replaceable cartridge by at least one of melting a fusible portion of the reservoir or opening a valve on the reservoir.

22. A method of cooling an aircraft brake, the brake comprising a brake pack and a cartridge containing a coolant, wherein the brake pack includes stators and rotors, and the cartridge is positioned in the brake adjacent to the stators and the rotors, the method comprising:
   prior to a braking event, the cartridge is spaced apart from the stators and the rotors;
   during the braking event, moving the cartridge into contact with an inner rim of at least one of the stators or rotors; and
   vaporizing the coolant in the cartridge by transferring heat energy from the at least one of the stators and rotors to the coolant during a braking event.

23. The method of claim 22, further comprising:
   after the braking event, removing the cartridge from the aircraft brake, and after the removal, installing the cartridge into the brake or installing a second cartridge into the brake in place of the removed cartridge.

24. An aircraft brake for a landing gear of an aircraft, the aircraft brake comprising:
   stators configured to be connected to a landing gear bogie of the landing gear;
   rotors configured to be connected to a wheel of the landing gear; and
   a cartridge including a reservoir for a liquid coolant, wherein the cartridge is configured to move between a first position spaced apart from the stators and rotors, and a second position at which the cartridge contacts with an inner rim of at least one of the stators or rotors, during a braking event.

25. The method of claim 1 further comprising:
   removing the cartridge after the braking event, and
   after the removal, mounting the removed cartridge or another cartridge in the brake.

26. The method of claim 1 wherein the cartridge moves into contact with inner rims of the multiple ones of the stators or rotors during the brake event.

27. The aircraft brake of claim 11 wherein the removable cartridge is configured to move into contact with inner rims of the multiple ones of the stators or the rotors while in the second position.

28. The method of claim 19 wherein the step of moving the replaceable cartridge into contact with an inner rim of the at least one of the stators or the rotors.

* * * * *